(12) United States Patent
Lumezanu et al.

(10) Patent No.: US 8,976,661 B2
(45) Date of Patent: Mar. 10, 2015

(54) NETWORK SELF-PROTECTION

(71) Applicant: NEC Laboratories America, Inc., Princeton, NJ (US)

(72) Inventors: Cristian Lumezanu, East Windsor, NJ (US); Guofei Jiang, Princeton, NJ (US); Yueping Zhang, Princeton, NJ (US); Vishal Singh, Princeton, NJ (US); Ye Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 251 days.

(21) Appl. No.: 13/736,146

(22) Filed: Jan. 8, 2013

(65) Prior Publication Data
US 2013/0176852 A1 Jul. 11, 2013

Related U.S. Application Data

(60) Provisional application No. 61/585,337, filed on Jan. 11, 2012.

(51) Int. Cl.
*H04L 12/26* (2006.01)
*H04L 12/801* (2013.01)
*H04L 12/891* (2013.01)

(52) U.S. Cl.
CPC .............. *H04L 47/12* (2013.01); *H04L 47/41* (2013.01); *Y02B 60/33* (2013.01)
USPC ........................................................ 370/235

(58) Field of Classification Search
USPC ........................................................ 370/235
See application file for complete search history.

(56) References Cited

U.S. PATENT DOCUMENTS

| | | | |
|---|---|---|---|
| 2003/0105976 A1* | 6/2003 | Copeland, III | 713/201 |
| 2006/0075093 A1* | 4/2006 | Frattura et al. | 709/224 |
| 2008/0232375 A1* | 9/2008 | Hachiya et al. | 370/392 |
| 2009/0003209 A1* | 1/2009 | Kalkunte et al. | 370/232 |
| 2013/0117847 A1* | 5/2013 | Friedman et al. | 726/22 |
| 2013/0246655 A1* | 9/2013 | Itoh | 709/238 |

OTHER PUBLICATIONS

Dynamic Computation of TCP Maximum Window Size for Directly Connected Hosts; IBM; Publication Mar. 26, 2005.*
M. Alizadeh, A. Greenberg, D. A. Maltz, J. Padhye, P. Patel, B. Prabhakar, S. Sengupta, and M. Sridharan, "Data Center TCP (DCTCP)," in Proc. ACM SIGCOMM, Aug. 2010.
H. Ballani, P. Costa, T. Karagiannis, and A. Rowstron, "Towards Predictable Datacenter Networks," in Proc. ACM SIGCOMM, Aug. 2011.
Why Amazon's cloud Titanic went down. [Online]. Available: http://money.cnn.com/2011/04/22/technology/amazon_ec2_cloud_outage/index.htm.
G. Cormode, S. Muthukrishnan, and D. Srivastava, "Finding hierarchical heavy hitters in data streams," in Proc. In Proc. of VLDB, 2003, pp. 464-475.

(Continued)

*Primary Examiner* — Brandon Renner
*Assistant Examiner* — Faisal Choudhury
(74) *Attorney, Agent, or Firm* — Joseph Kolodka; Akitaka Kimura

(57) ABSTRACT

A device used in a network is disclosed. The device includes a network monitor to monitor a network state and to collect statistics for flows going through the network, a flow aggregation unit to aggregate flows into clusters and identify flows that can cause a network problem, and an adaptive control unit to adaptively regulate the identified flow according to network feedback. Other methods and systems also are disclosed.

9 Claims, 8 Drawing Sheets

(56) References Cited

OTHER PUBLICATIONS

A. Greenberg, J. R. Hamilton, N. Jain, S. Kandula, C. Kim, P. Lahiri, D. A. Maltz, P. Patel, and S. Sengupta, "VL2: a Scalable and Flexible Data Center Network," in Proc. ACM SIGCOMM, Aug. 2009.

C. Guo, G. Lu, D. Li, H.Wu, X. Zhang, Y. Shi, C. Tian, Y. Zhang, and S. Lu, "BCube: a High Performance, Server-Centric Network Architecture for Modular Data Centers," in Proc. ACM SIGCOMM, Aug. 2009.

C. Guo, G. Lu, H. J. Wang, S. Yang, C. Kong, P. Sun, W. Wu, and Y. Zhang, "SecondNet: A Data Center Network Virtualization Architecture with Bandwidth Guarantees," in Proc. ACM CoNEXT, Nov. 2010.

R. N. Mysore, A. Pamboris, N. Farrington, N. Huang, P. Miri, S. Radhakrishnan, V. Subramanya, and A. Vandat, "PortLand: a Scalable Fault-Tolerant Layer 2 Data Center Network Fabric," in Proc. ACM SIGCOMM, Aug. 2009.

V. Vasudevan, A. Phanishayee, H. Shah, E. Krevat, D. G. Anderson, G. R. Ganger, G. A. Gibson, and B. Mueller, "Safe and Effective Fine-Grained TCP Retransmissions for Datacenter Communication," in Proc. ACM SIGCOMM, Aug. 2009.

C. Wilson, H. Ballani, T. Karagiannis, and A. Rowstron, "Better Never than Late: Meeting Deadlines in Datacenter Networks," in Proc. ACM SIGCOMM, Aug. 2011.

A. Wundsam, D. Levin, S. Seetharaman, and A. Feldmann, "OFRewind: Enabling Record and Replay Troubleshooting for Networks," in Proc. USENIX Annual Technical Conference, Jun. 2011.

Y. Zhang, S. Singh, S. Sen, N. Duffield, and C. Lund, "Online identification of hierarchical heavy hitters: algorithms, evaluation, and applications," in Proc. Proceedings of the 4th ACM SIGCOMM conference on Internet measurement, ser. IMC '04.

\* cited by examiner

|    | Aggregtaion condition | Example overloading reason |
|----|----------------------|---------------------------|
| P1 | ingress and egress | end-to-end flooding |
| P2 | source subnet | compromised VMs |
| P3 | destination subnet | flash crowd to specific VMs |
| P4 | destination port | attack against specific services |
| P5 | routing | routing misconfiguration |
| P6 | start time range | correlated data transfers |
| P7 | frequency threshold | new traffic load |
| P8 | duration threshold | short/failed connection attempts |
| P9 | burstiness threshold | buggy customized TCP |
| ... | ... | ... |

FIG. 3

Algorithm 1: $\text{maxAgg}(\pi)$

1   $\pi^* = \{P | P \in \pi, S(P) > th\}$;
2   while $|\pi^*| > 1$ do
3      select $P$ from $\pi*$, foreach $P' \in \pi*$ do
4          if $not\ (P \leq P'\ or\ P' \leq P)$ then
5              $P'' = PP'$;
6              if $P'' \notin \pi^*$ and $S(P'') > S(P)$ and $S(P'') > S(P')$ then
7                  $\pi^* \leftarrow \pi^* \cup P''$;

8      if $\max\{S(P) | P \in \pi^*\} > S(P)$ then
9          $\pi^* \leftarrow \pi^* - \{P\}$;

10   if $\pi^* == \emptyset$ then
11      $P^* \leftarrow$ flows;
12   else
13      $P^* \leftarrow$ the only aggregation in $\pi^*$

FIG. 6

NETWORK SELF-PROTECTION

This application claims the benefit of U.S. Provisional Application No. 61/585,337, entitled, "NetFuse: Fighting Flares in the Cloud," filed on Jan. 11, 2012, the contents of which are incorporated herein by reference.

BACKGROUND OF THE INVENTION

The present invention relates to a network and, more particularly, to a self-protected network.

Modern data center networks are constructed with advanced infrastructures and well-engineered protocols and are operated with extreme cautions. However, the fierce challenge of network failures is still unchanged, if not intensified, especially as an ever growing population of applications and services enter the era of Cloud. Amazon EC2, for instance, was largely down on Apr. 21, 2011 due to a routing misconfiguration that mistakenly rerouted high-volume external traffic into the low-capacity internal network [3]. As a consequence, thousands of businesses and websites were out of service and seventy-five million PlayStation gamers were affected [5]. Another recent example is the three-day blackout of Blackberry in October 2011 as a result of a core switch failure.

To mitigate these problems, a surge of recent efforts are currently underway and have demonstrated encouraging results. One school of people approach the problem by designing next-generation network infrastructures that can improve network bisection bandwidth and provide malleability in the network routing topology [5, 6, 8]. Another group of researchers focus on designing network transport protocol [1, 9] that is particularly fine tuned for data center networks. A last bunch of people seek to propose improved resource placement [2, 7] schemes that can optimize the network resource allocation. At the same time, however, we believe that the cascading catastrophic network failures are unlikely to be prevented without proper considerations of two fundamental assumptions that do not hold in data centers.

We design NetFuse, which is, analogously to the fuse boxes in the electrical circuits, a self-protection mechanism that seeks to detect and respond to a variety of network problems and protect the necessary network services. Specifically, NetFuse employs a multi-dimensional flow aggregation algorithm that automatically determines an optimal set of clustering criteria and identifies the suspicious flows that are likely to cause network problems under these criteria. Then, NetFuse adaptively regulates the identified flows according to the network feedback. Due to the light-weight sensing capabilities inherent in the OpenFlow technologies, NetFuse is currently implemented in OpenFlow networks as a proxy device between the switches and the controller. This way, NetFuse can not only intercept the control messages and infer the network states, but also offload the excessive processing overhead for the controller, thereby improving scalability of the entire system.

[1] M. Alizadeh, A. Greenberg, D. A. Maltz, J. Padhye, P. Patel, B. Prabhakar, S. Sengupta, and M. Sridharan, "Data Center TCP (DCTCP)," in Proc. ACM SIGCOMM, August 2010.

[2] H. Ballani, P. Costa, T. Karagiannis, and A. Rowstron, "Towards Predictable Datacenter Networks," in Proc. ACM SIGCOMM, August 2011.

[3] Why Amazon's cloud Titanic went down. [Online] Available: http://money.cnn.com/2011/04/22/technology/amazon_ec2_cloud outage/index.htm.

[4] G. Cormode, S. Muthukrishnan, and D. Srivastava, "Finding hierarchical heavy hitters in data streams," in Proc. In Proc. of VLDB, 2003, pp. 464-475.

[5] A. Greenberg, J. R. Hamilton, N. Jain, S. Kandula, C. Kim, P. Lahiri, D. A. Maltz, P. Patel, and S. Sengupta, "VL2: a Scalable and Flexible Data Center Network," in Proc. ACM SIGCOMM, August 2009.

[6] C. Guo, G. Lu, D. Li, H.Wu, X. Zhang, Y. Shi, C. Tian, Y. Zhang, and S. Lu, "BCube: a High Performance, Server-Centric Network Architecture for Modular Data Centers," in Proc. ACM SIGCOMM, August 2009.

[7] C. Guo, G. Lu, H. J. Wang, S. Yang, C. Kong, P. Sun, W. Wu, and Y. Zhang, "SecondNet: A Data Center Network Virtualization Architecture with Bandwidth Guarantees," in Proc. ACM CoNEXT, November 2010.

[8] R. N. Mysore, A. Pamboris, N. Farrington, N. Huang, P. Miri, S. Radhakrishnan, V. Subramanya, and A. Vandat, "PortLand: a Scalable Fault-Tolerant Layer 2 Data Center Network Fabric," in Proc. ACM SIGCOMM, August 2009.

[9] V. Vasudevan, A. Phanishayee, H. Shah, E. Krevat, D. G. Anderson, G. R. Ganger, G. A. Gibson, and B. Mueller, "Safe and Effective Fine-Grained TCP Retransmissions for Datacenter Communication," in Proc. ACM SIGCOMM, August 2009.

[10] C. Wilson, H. Ballani, T. Karagiannis, and A. Rowstron, "Better Never than Late: Meeting Deadlines in Datacenter Networks," in Proc. ACM SIGCOMM, August 2011.

[11] A. Wundsam, D. Levin, S. Seetharaman, and A. Feldmann, "OFRewind: Enabling Record and Replay Troubleshooting for Networks," in Proc. USENIX Annual Technical Conference, June 2011.

[12] Y. Zhang, S. Singh, S. Sen, N. Duffield, and C. Lund, "Online identification of hierarchical heavy hitters: algorithms, evaluation, and applications," in Proc. Proceedings of the 4th ACM SIGCOMM conference on Internet measurement, ser. IMC '04.

BRIEF SUMMARY OF THE INVENTION

NetFuse leverages the powerful network sensing capabilities of OpenFlow's unique messaging mechanism. As a standalone product, NetFuse can proactively protect the network infrastructure from hard-to-find problems and prevent failure propagation. This is very important for Cloud service providers or data center operators and can rescue the network from disastrous network downtime and service disruption. NetFuse is also a value added services that can be built over OpenFlow switches and therefore are expected to boost the sales and marketing of OpenFlow devices.

An objective of the present invention is to detect, or react to, a network problem such as network overload.

An aspect of the present invention includes a device used in a network, comprising a network monitor to monitor a network state and to collect statistics for flows going through the network, a flow aggregation unit to aggregate flows into clusters and identify flows that can cause a network problem, and an adaptive control unit to adaptively regulate the identified flow according to network feedback.

Another aspect of the present invention includes a method used in a network, comprising monitoring a network state and to collect statistics for flows going through the network, aggregating flows into clusters and identify flows that can cause a network problem, and adaptively regulating the identified flow according to network feedback.

BRIEF DESCRIPTION OF THE DRAWINGS

FIG. 3 depicts an example reasonable flow aggregations.

FIG. 6 depicts Algorithm 1.

DETAILED DESCRIPTION

Figure 1:
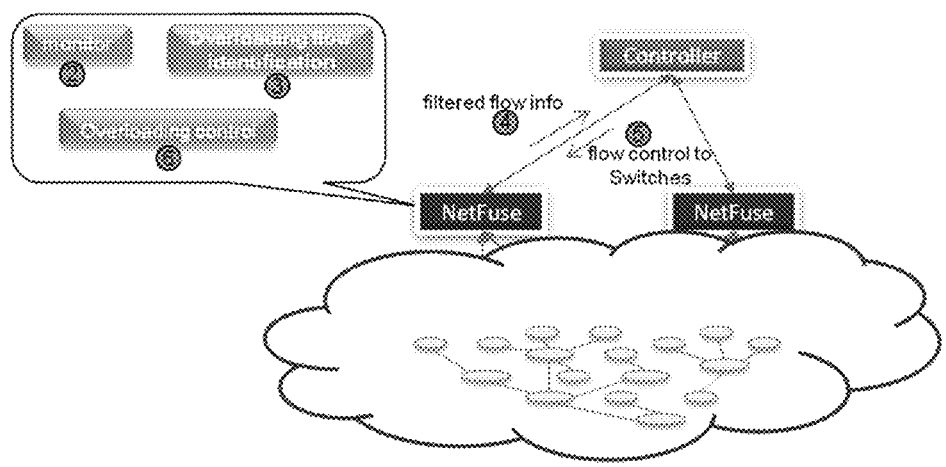
FIG. 1 depicts a system architecture.

As illustrated in FIG. 1, NetFuse comprises three major components: network monitor, flow aggregation, and adaptive control. First, NetFuse continuously monitors the network states and collect statistics for flows going through the network. Then, during flow aggregation, NetFuse identifies the suspicious flows that are likely to cause network problems. Finally, NetFuse adaptively regulates the identified flows according to the network feedback.

Leveraging the light-weight sensing capabilities inherent in the OpenFlow technologies, NetFuse is currently implemented in OpenFlow networks as a proxy device between the switches and the controller. But NetFuse is not limited to OpenFlow and can be applied to general network systems if monitoring data are available.

Figure 2:
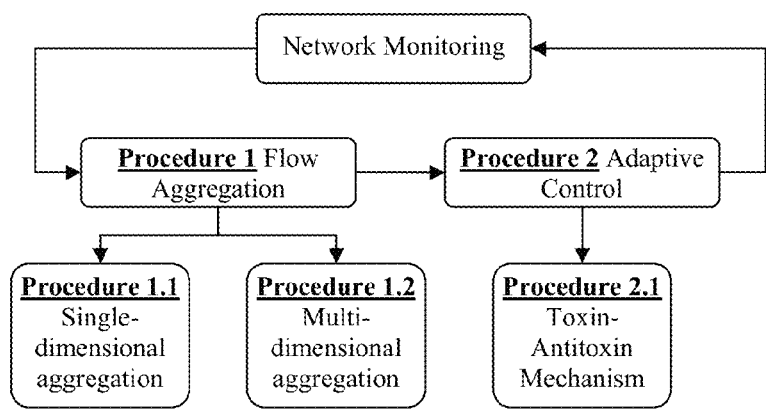
FIG. 2 depicts a flow chart related to the system architecture.

The above system architecture can be mapped to the flow chart in FIG. 2.

Procedure 1: Flow Aggregation

This procedure seeks to aggregate flows into clusters and find the cluster that is most likely to be responsible for certain network problems. In the input of this procedure is flow statistics and the output is clusters of suspicious flows. Procedure 1.1 and 1.2 are specific solutions that accomplish this goal.

Procedure 1.1: Single-Dimensional Aggregation

First, define a score S(P) to measure the significance of the overloading flows: $S(P)=(max(F)-m^-(F))/m^-(F)$, where $m^-$ is the low median operator. Then, the goal is to find the aggregation that best reveals the overloading behavior, i.e., $P^*=max_P S(P)$. Next, select or define the aggregations that reveal overloading behavior, based on best practice or operator specifications for the aggregation rules. FIG. 3 is an example set of aggregation rules.

For aggregation rules that require a threshold value, we define the value according to different applications. There are many ways to determine this.

After all the above information is available, the algorithm simply chooses one aggregation rules, clusters flows based on this rule, and outputs the set of flows with the highest score or the score exceeding the predetermined threshold values.

Procedure 1.2: Multi-Dimensional Aggregation

Figure 4:
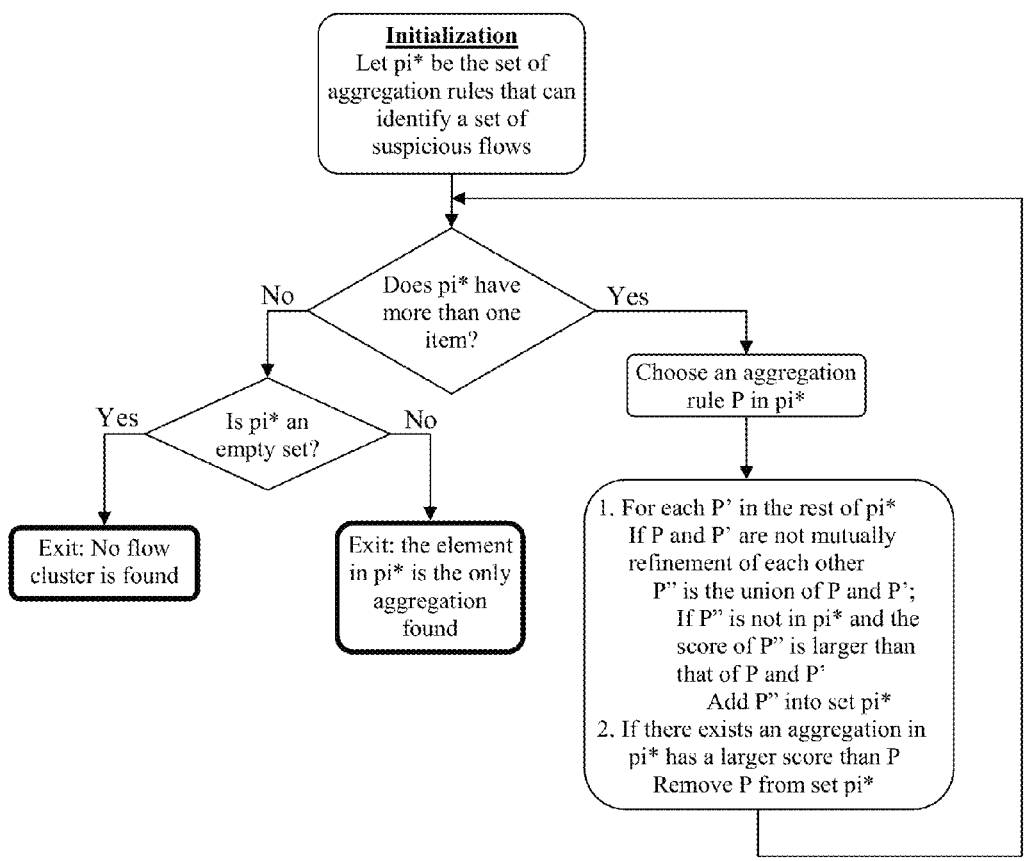
FIG. 4 depicts a flowing diagram that illustrates Procedure 1.2.
Figure 5:
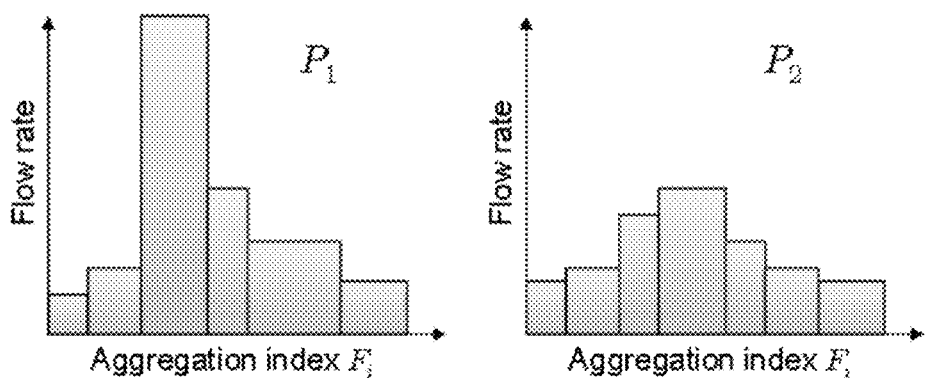
FIG. 5 depicts an example of different flow aggregations.
Figure 7:
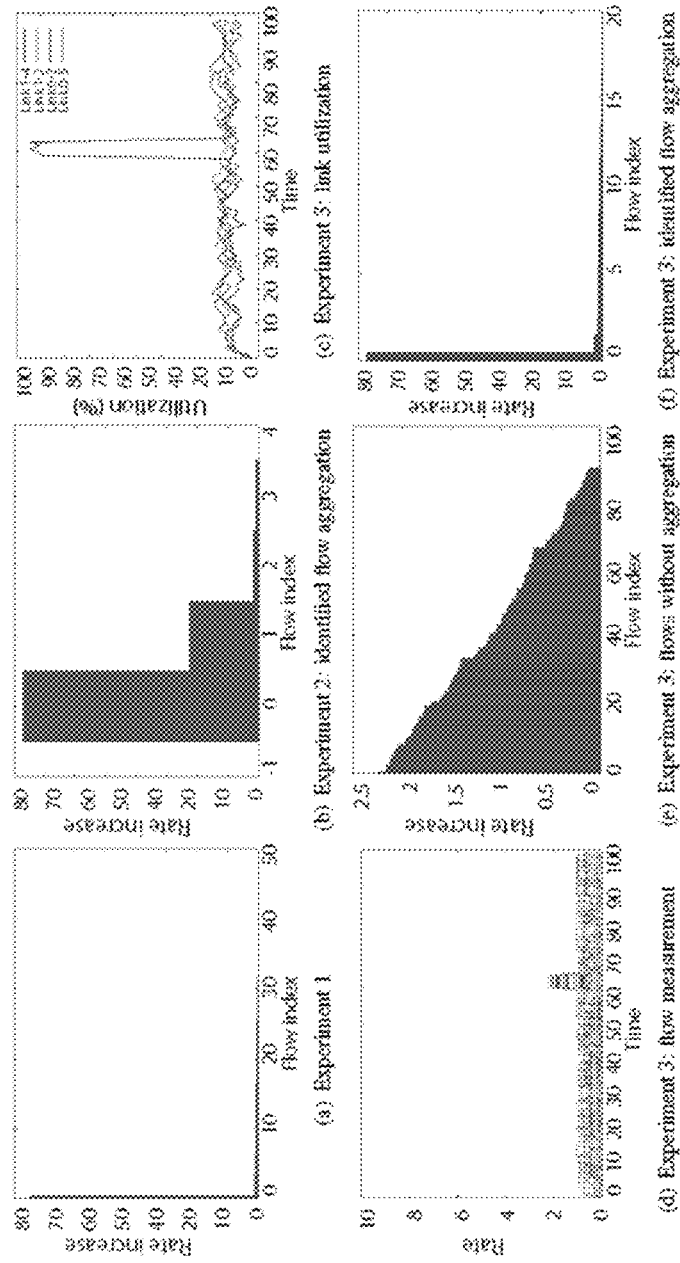
FIG. 7 depicts preliminary experiment results.
Figure 8:
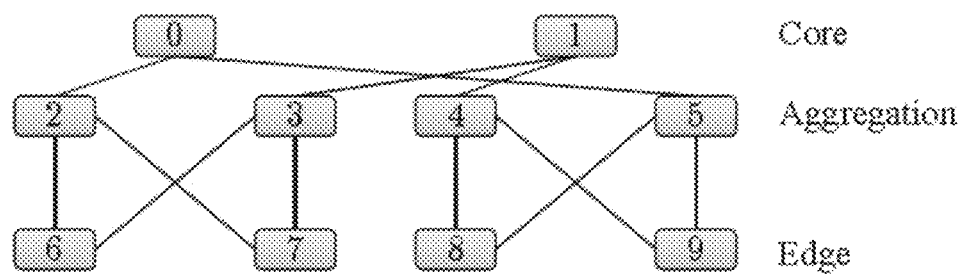
FIG. 8 depicts FatTree network topology.

In practice, the overloading can be caused by specific applications at specific network regions, corresponding to a combination of multiple aggregation conditions on different flow properties. This procedure correlate multiple aggregation rules and identify the combination of rules that most evidently real the network problems. As illustrated in FIG. 4, this procedure is essentially a breadth-first search algorithm with branch pruning to enumerate the multi-dimensional flow.

Procedure 2: Adaptive Control

This procedure applies adaptive control on flows generated in Procedure 1. Procedure 2.1 is one way to realize this adaptive control.

Procedure 2.1: Toxin-Antitoxin Control

When NetFuse apply extra delays to an overloading flow f's RTT (round-trip delay time), NetFuse tests the aggressiveness of f's response. If f reduces its rate, the extra delay will also be reduced, and eventually it will no longer suffer extra delay but enjoy the original data path; otherwise, the extra delay increases and eventually fills the buffer, dropping all packets of f. If the target rate of f is r, while f's current rate demand (measured at NetFuse box buffer queue) is $r_f$, the extra delay NetFuse put on f is: $(r_f-r) \times r_f \times RTT/r$. Assuming the flows employ TCP (Transmission Control Protocol) and thus the flow rate is inversely proportional to RTT, since $r_f \sim RTT$, the extra delay on f intends to reduce flow rate from $r_f$ to r. In practice, well-behaving flows respond to the extra delay by lowering the rate to or under r, and thus it will see no more extra delay at NetFuse; ill-behaving flows may continue take higher rate than they should, and NetFuse will continue delaying their packets, with possible mandatory drops.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method used in a network, the method comprising:
   monitoring a network state and to collect statistics for flows going through the network;
   aggregating flows into clusters and identify flows that can cause a network problem; and
   adaptively regulating the identified flow according to network feedback,
   wherein the flow aggregation comprises:
   defining score $S(P)=max(F)-m^-(F)=m^-(F)$, where S is the score to measure significance of overloading flows, P is an aggregation rule and a set partition $\{F_1, F_2, \ldots, F_k\}$, F is one of $F_1, F_2, \ldots,$ and $F_k$, and $m^-$ is a low median operator;
   finding an aggregation rule that reveals an overloading behavior $P^*=max_P S(P)$, where $P^*$ is the aggregation rule that reveals the overloading behavior; and
   defining a set of aggregation rules.

2. The method as in claim 1, wherein the set of aggregation rules are obtained from a past experience or an operator specification.

3. The method as in claim 1, wherein the set of aggregation rules include at least one of:
   ingress or egress for end-to-end flooding,
   a source subnet for a compromised virtual machine (VM),
   a destination subnet for flash crowd to a specific VM,
   a destination port for attack against a specific service,
   a list of switches or routers on a path for routing misconfiguration,
   a start time range for a correlated data transfer,
   a packet arrival frequency threshold for new traffic load,
   a duration threshold for a short or failed connection attempt, and a burstiness threshold for buggy customized Transmission Control Protocol (TCP).

4. The method as in claim 1,
wherein at least one of the aggregation rules requires a threshold, and
wherein different threshold values are defined according to different applications.

5. The method as in claim 1,
wherein the flow aggregation comprises:
choosing one of the aggregation rules;
clustering flows based on said one of the aggregation rules; and
outputting the set of flows with a highest score or a score exceeding a predetermined threshold value.

6. The method as in claim 1,
wherein the flow aggregation comprises:
choosing aggregation rule P in pi*, where pi* is the set of aggregation rules;
for each P' in the rest of pi*, where P' is another aggregation rule, adding P'', which is a union of P and P', into pi*, in case that P and P' are not mutually refinement of each other and P'' is not in pi* and a score of P'' is larger than a score of P and P'; and
removing P from pi* in case pi* includes an aggregation rule that has a lager score than P.

7. The method as in claim 1,
wherein the adaptive regulation comprises:
applying an extra delay to round-trip delay time (RTT) of an overloading flow.

8. The method as in claim 1, wherein the network comprises an OpenFlow network.

9. The method as in claim 8, wherein the method is used in a proxy device disposed between a switch and a controller.

* * * * *